(12) United States Patent
Cha et al.

(10) Patent No.: US 11,133,765 B2
(45) Date of Patent: Sep. 28, 2021

(54) METHOD AND APPARATUS FOR DRIVING MOTOR FOR ECO-FRIENDLY VEHICLE

(71) Applicants: Hyundai Motor Company, Seoul (KR); Kia Motors Corporation, Seoul (KR)

(72) Inventors: Ji Wan Cha, Incheon (KR); Han Hee Park, Gyeonggi-do (KR); Jae Hyeon Lee, Gyeonggi-do (KR); Seong Min Kim, Gyeongsangnam-do (KR); Hyun Woo Noh, Seoul (KR); Tae Il Yoo, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 212 days.

(21) Appl. No.: 16/435,883

(22) Filed: Jun. 10, 2019

(65) Prior Publication Data
US 2020/0136535 A1 Apr. 30, 2020

(30) Foreign Application Priority Data
Oct. 25, 2018 (KR) .................. 10-2018-0128178

(51) Int. Cl.
*H02K 3/28* (2006.01)
*H02P 6/08* (2016.01)
*H02K 29/00* (2006.01)
*H02K 1/12* (2006.01)
*H02K 1/27* (2006.01)
*H02P 25/18* (2006.01)

(52) U.S. Cl.
CPC ............. *H02P 6/08* (2013.01); *H02K 1/12* (2013.01); *H02K 29/00* (2013.01); *H02P 25/18* (2013.01)

(58) Field of Classification Search
CPC ........ H02K 1/12; H02K 29/00; H02P 25/188; H02P 6/08; Y02T 10/70; Y02T 10/72
USPC .......................................... 318/700; 310/184
See application file for complete search history.

(56) References Cited

U.S. PATENT DOCUMENTS

| | | | |
|---|---|---|---|
| 6,847,147 B2 * | 1/2005 | Gladkov | H02K 21/225 310/153 |
| 2002/0125855 A1 * | 9/2002 | Johnson | H02P 27/045 318/801 |
| 2005/0269979 A1 * | 12/2005 | Min | H02P 25/04 318/66 |
| 2007/0018616 A1 * | 1/2007 | Shah | H02P 9/48 322/46 |
| 2008/0116759 A1 * | 5/2008 | Lin | H02K 11/20 310/184 |

FOREIGN PATENT DOCUMENTS

JP 5464224 B2 4/2014
KR 100524728 B1 10/2005

* cited by examiner

*Primary Examiner* — Kawing Chan
*Assistant Examiner* — Zemenay T Truneh
(74) *Attorney, Agent, or Firm* — Mintz Levin Cohn Ferris Glovsky and Popeo, P.C.; Peter F. Corless

(57) ABSTRACT

An apparatus for driving a motor for an eco-friendly vehicle is provided. The apparatus includes a motor that has a rotor and a stator and a controller that operates the motor. The motor includes a plurality of stator coils and stator relays and the controller operates the stator relays based on an operation mode to adjust the number of turns of the stator coils.

17 Claims, 4 Drawing Sheets

METHOD AND APPARATUS FOR DRIVING MOTOR FOR ECO-FRIENDLY VEHICLE

CROSS REFERENCE TO RELATED APPLICATION

This application claims priority under 35 U.S.C. § 119 to Korea Application No. 10-2018-0128178 filed on Oct. 25, 2018, which is hereby incorporated in its entirety by reference as if fully set forth herein.

BACKGROUND

Field of the Invention

The present invention relates to a method and apparatus for driving a motor of an eco-friendly vehicle, and more specifically, to a method and apparatus for driving a motor that change the number of turns of stator coils through on/off control of stator relays.

Discussion of the Related Art

In general, eco-friendly vehicles such as electric vehicle (EV), hybrid electric vehicles (HEV), plug-in hybrid electric vehicles (PHEV), and fuel cell electric vehicles (FCEV) use electric driving power as a main driving source and have a motor system that includes a motor, an inverter and a battery as a main power supply. The motor may include a rotator (rotor) that has a permanent magnet inserted therein and a stator including stator coils, in which current flows. The inverter controls current flowing in the motor and the battery is a main source of electric energy.

In the related art, various methods are used to operate the motor with optimal efficiency. Techniques such as optimal arrangement of a permanent magnet for reducing leakage flux and a lamination structure of a thin steel plate have been applied to the rotor. Additionally, techniques such as application of stator coils having an optimal shape for increasing a space factor, a structure for reducing loss of an end and increase in number of turns of the stator coils for reducing current flowing in the stator coils have been applied to the stator.

In particular, the technique of increasing the number of turns (e.g., the number of times of winding) of the stator coils is one of the methods capable of more efficiently increasing motor efficiency. Fundamentally, if there is no problem with vehicle mountability, the number of turns of the stator coils may be increased to reduce current flowing in the stator coils, thereby reducing a loss factor called copper loss ($I^2R$). In addition, reduced current reduces conduction loss in the inverter, thereby maximizing fuel efficiency of the motor system and increasing fuel efficiency of the eco-friendly vehicle. However, upon increasing the number of turns of the stator coils for high-efficiency operation according to the related art, torque/output of a low-speed section may be increased, but high output is unable to be maintained from a middle-speed section to a highest-speed section.

SUMMARY

Accordingly, the present invention provides a method and apparatus for driving a motor for an eco-friendly vehicle that substantially obviate one or more problems due to limitations and disadvantages of the related art. More specifically, the present invention provides a configuration of stator coils of a motor for an eco-friendly vehicle and a vehicle operation strategy. An object of the present invention is to provide a method of changing the number of turns of the stator coils through on/off control of stator relays and a vehicle using the same.

In one exemplary embodiment, an apparatus for driving a motor for an eco-friendly vehicle may include a motor having a rotor and a stator and a controller configured to operate the motor. The motor may include a plurality of stator coils and stator relays and the controller may be configured to operate the stator relays according to an operation mode to adjust the number of turns of the stator coils.

In some exemplary embodiments, the controller may be configured to select the operation mode based on vehicle driving mode information. In addition, the controller may be configured to select any one of a first operation mode, in which the number of turns of the stator coils is increased, and a second operation mode, in which the number of turns of the stator coils is decreased, as the operation mode. In some exemplary embodiments, the motor may include three phases.

The motor may also include series circuits, in which at least two stator coils are connected in series, in each phase, and at least two series circuits may be connected in parallel. The number of stator relays may be determined by Equation 1 below:

$$\text{number of relays in each phase: } [(S-1)*2]*P \qquad \text{Equation 1}$$

wherein, S denotes the number of stator coils of each of the series circuits and P denotes the number of series circuits connected in parallel.

Further, the motor may include a first stator coil, a second stator coil, a first stator relay connected to the second stator coil in parallel, and a second stator relay connected to the second stator coil in series, and the first stator coil, the second stator relay and the second stator coil may be connected in series, and the first stator relay and the second stator relay may be connected in parallel.

The controller may be configured to turn off the first stator relay and turn on the second stator relay, when the operation mode is a first operation mode. In addition, the controller may be configured to turn on the first stator relay and turn off the second stator relay, when the operation mode is a second operation mode.

BRIEF DESCRIPTION OF THE DRAWINGS

Arrangements and exemplary embodiments will be described in detail with reference to the following drawings in which like reference numerals refer to like elements and wherein.

DETAILED DESCRIPTION

Figure 1:
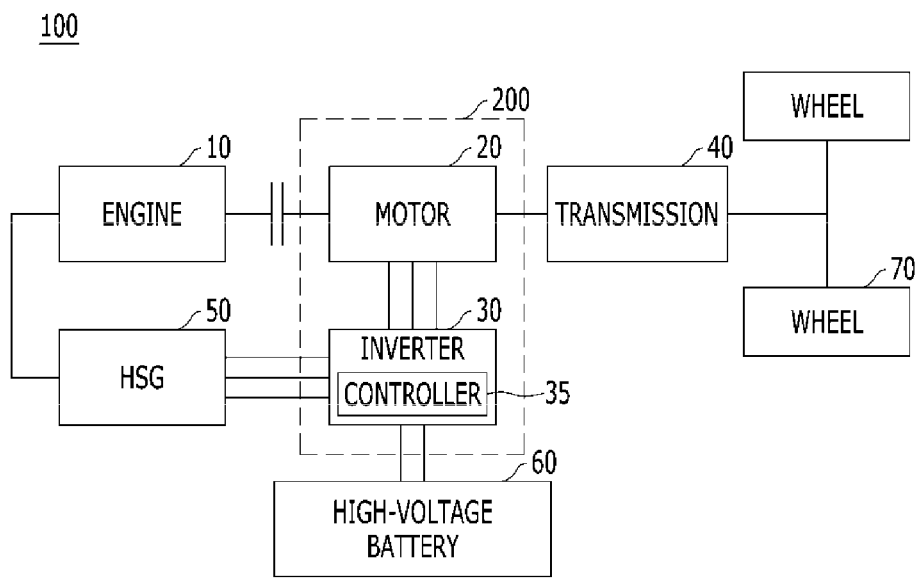
FIG. 1 is a block diagram of a vehicle according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

An apparatus and various methods, to which the exemplary embodiments of the present invention are applied, will now be described more fully hereinafter with reference to the accompanying drawings. The suffixes "module" and "unit" of elements herein are used for convenience of description and thus can be used interchangeably and do not have any distinguishable meanings or functions. In the following description of the exemplary embodiments, it will be understood that, when each element is referred to as being formed "on" (above) or "under" (below) or "before" (ahead) or "after" (behind) the other element, it can be directly "on" (above) or "under" (below) or "before" (ahead) or "after" (behind) the other element or be indirectly formed with one or more intervening elements therebetween.

It will be understood that, although the terms first, second, A, B, (a), (b), etc. may be used herein to describe various elements of the present invention, these terms are only used to distinguish one element from another element and necessity, order, or sequence of corresponding elements are not limited by these terms. It will be understood that when one element is referred to as being "connected to", "coupled to", or "accessing" another element, one element may be "connected to", "coupled to", or "accessing" another element via a further element although one element may be directly connected to or directly access another element.

A method and apparatus for driving a motor for an eco-friendly vehicle according to the present invention may adjust the number of turns of stator coils wound in phases U, V and W of a stator of a motor using the stator coils, the number of turns of which may be changed, through on/off control of a stator relay. At this time, on/off control of the stator relays may change the number of turns according to the operation mode of the vehicle.

Figure 2:
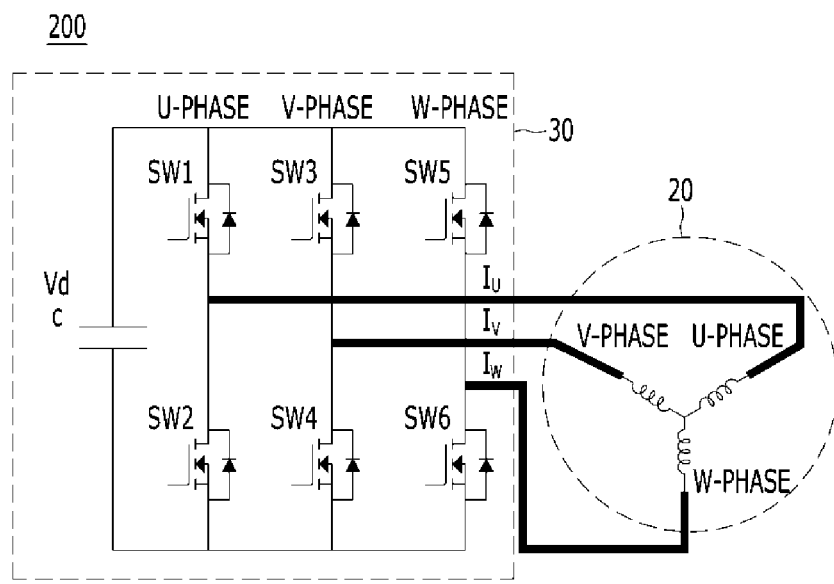
FIG. 2 is a diagram showing an apparatus for driving a motor for an eco-friendly vehicle according to an exemplary embodiment of the present invention.

FIG. 1 is a block diagram of a vehicle according to an exemplary embodiment of the present invention, and FIG. 2 is a diagram showing an apparatus for driving a motor for an eco-friendly vehicle according to an exemplary embodiment of the present invention. Referring to FIG. 1, the vehicle 100 may include an engine 10, a motor 20, an inverter 30, a transmission 40, a battery 60, a hybrid starter generator (HSG) 50 and wheels 70. The motor 20 and the inverter 30 may together be an apparatus for driving a motor for an eco-friendly vehicle.

The engine 10 may be configured to generate power by burning fuel. The motor 20 may be configured to assist the power of the engine 10 and operate as a generator during braking or deceleration of the vehicle, thus generating electric energy. In some exemplary embodiments, the motor 20 may be implemented as an internal permanent magnet (IPM) type motor in which a permanent magnet is inserted into the rotor core. The electric energy generated by the motor 20 may be stored in the battery 60.

The characteristics of the motor 20 may be changed based on the configuration of the stator coils. The motor 20 may have a plurality of motor characteristics according to drive control of the motor for the eco-friendly vehicle. Acceleration performance and fuel efficiency of the vehicle may be determined based on the characteristics of the motor 20.

Referring to FIG. 2, the motor 20 may be a three-phase (U, V and W) motor. The motor 20 may include stator coils, in which current flows, in the three phases U, V and W. The inverter 30 may include a voltage source Vdc and a plurality of switching elements SW1 to SW6. The inverter 30 may provide currents $I_U$, $I_V$ and $I_W$ to the motor, for operation of the switching elements.

Returning to FIG. 1, the inverter 30 may include a controller 35 configured to operate the motor 20. The controller 35 may be configured to receive vehicle driving mode information. The vehicle driving mode may include an auto mode and a manual mode. The auto mode may be a mode in which a real-time driving situation, a load, etc. are received. The manual mode may be a mode in which a user selects an operation mode. The controller 35 may be configured to select an operation mode based on the vehicle driving mode information.

The operation mode may include an eco mode and a power mode. The eco mode may be a first operation mode in which the number of turns of the stator coils in the motor 20 increases. The power mode may be a second operation mode in which the number of turns of the stator coils in the motor 20 decreases. The controller 35 may be configured to operate the stator relays in the motor in correspondence with the operation mode. For example, in the first operation mode, the controller 35 may be configured to turn the stator relays on and off to increase the number of turns of the stator coils. In the second operation mode, the controller 35 may be configured to turn the stator relays on and off to decrease the number of turns of the stator coils.

Further, the transmission 40 may be connected to the motor 20 in series and may be configured to transform power generated by the engine 10 into required rotation force based on speed and transmit the rotation force to the wheels 70. The HSG 50 may be configured to start the engine 10 or generate power by rotation force of the engine 10. The high-voltage battery 60 may be connected to be charged and discharged and may be charged during power generation.

Figure 3:
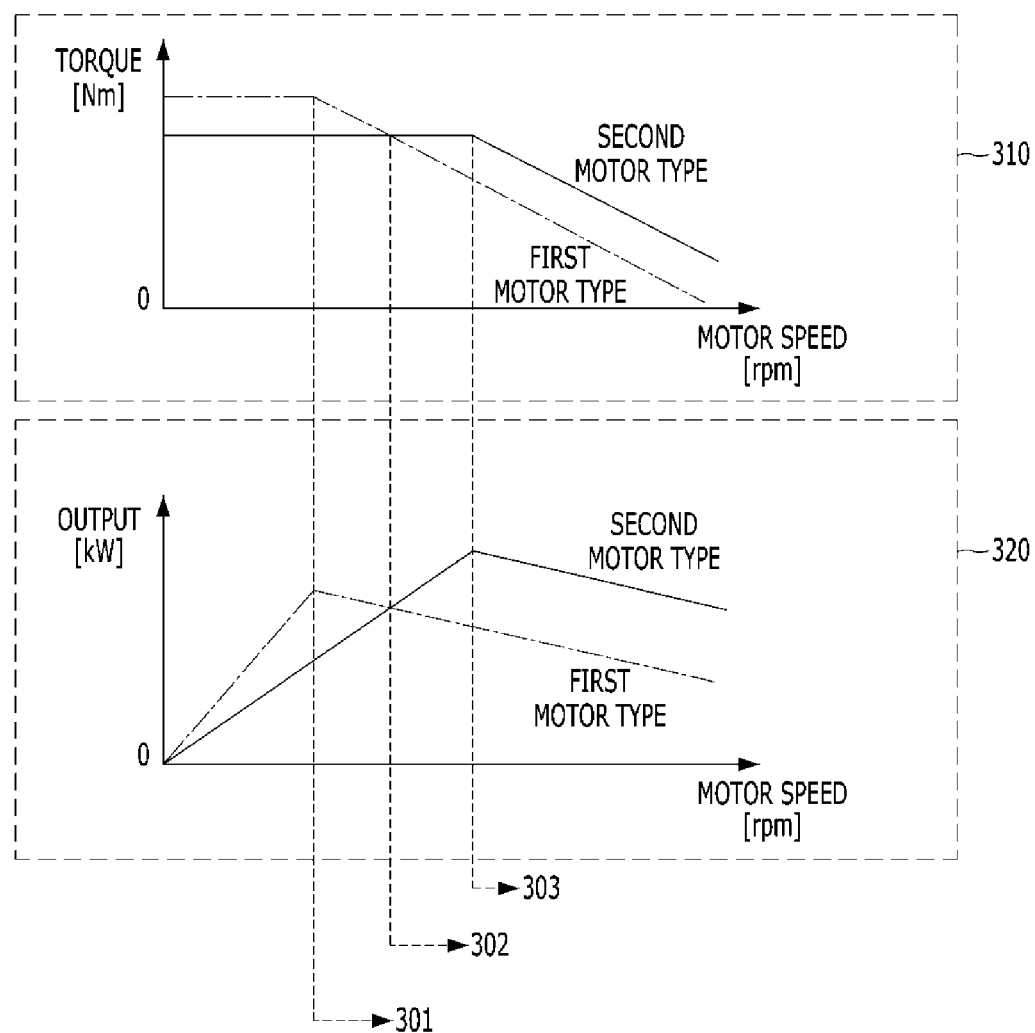
FIG. 3 is a graph showing motor driving characteristics based on the number of turns of stator coils according to an exemplary embodiment of the present invention.
Figure 4:
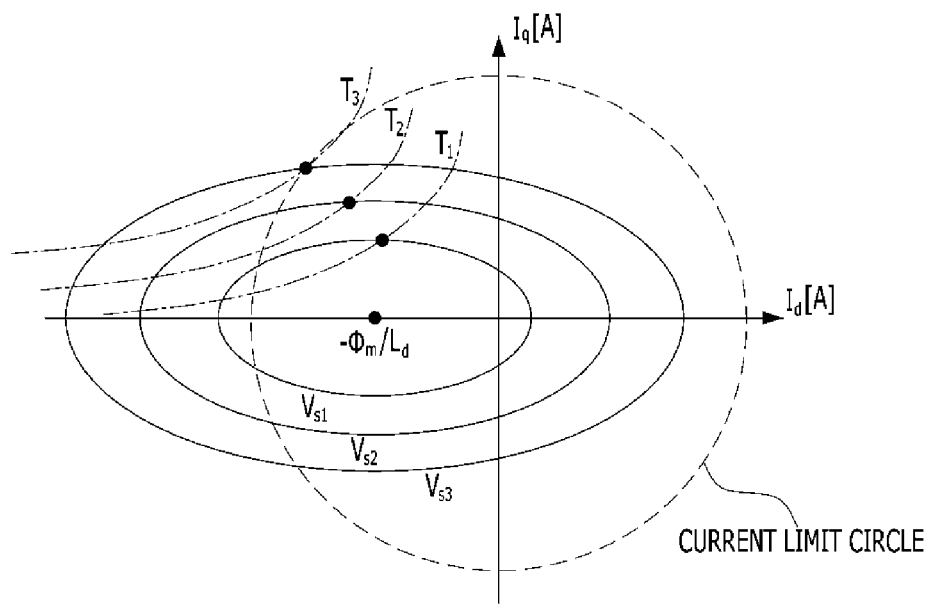
FIG. 4 is a view showing motor control characteristics according to an exemplary embodiment of the present invention.

FIG. 3 is a graph showing motor driving characteristics based on the number of turns of stator coils according to an exemplary embodiment of the present invention, and FIG. 4 is a view showing motor control characteristics according to an exemplary embodiment of the present invention. FIG. 3 shows a first graph showing a relationship between torque and motor speed according to first and second motor types and a second graph showing a relationship between output and motor speed according to the first and second motor types.

The horizontal axis of the first graph 310 represents increase in motor speed and the vertical axis of the first graph 310 represents increase in torque. The horizontal axis of the second graph 320 represents increase in motor speed and the vertical axis of the first graph 320 represents increase in output. The first motor type indicates a motor having a smaller number of turns of stator coils than the second motor type. In other words, the second motor type may have a greater number of turns of stator coils than the first motor type.

Referring to FIG. 3, when the motor speed is a first speed 301, the first motor type may obtain larger torque than the second motor type and the first motor type may obtain larger output than the second motor type. When the motor speed is a second speed 302, the first motor type and the second motor type may obtain the same torque and output. When the motor speed is a third speed 303, the first motor type may obtain smaller torque than the second motor type and the first motor type may obtain smaller output than the second motor type.

In other words, the first motor type may obtain the same torque with relatively small current based on the same torque as the second motor type, thereby reducing motor loss (e.g., stator coil copper loss $I^2R$) and inverter loss (e.g., conduction loss). Accordingly, the first motor type may be configured to operate the vehicle with higher fuel efficiency than the second motor type. However, as the motor speed increases to middle and high speeds 302 and 303 (e.g., second and third speeds), the motor 20 may be configured to operate by the motor control characteristics shown in FIG. 4.

Referring to FIG. 4, a region in which the motor may be operated at the middle and high speeds (e.g., second and third speeds) may be limited to voltage-limited elliptical regions $V_{s1}$, $V_{s2}$ and $V_{s3}$. The voltage-limited elliptical region 410 of the motor 20 may be decreased as a function of inductance Ld and magnetic flux interlinkage $\psi m$ of the permanent magnet increases. In other words, in the sizes of the voltage-limited elliptical regions, Vs3>Vs2>Vs1.

When the number of turns of the stator coils increases, inductance and magnetic flux interlinkage increase. Therefore, the voltage-limited elliptical regions Vs1, Vs2 and Vs3 may be reduced, and the motor 20 may be unable to obtain larger torque. In other words, in the equivalent torque curve according to the voltage-limited elliptical region, T3>T2>T1. Therefore, the output of the motor 20 decreases at the middle and high speeds (e.g., second and third speeds). The first motor type having the relatively smaller number of turns of the stator coils may show difficulty in high-efficiency operation and instead may perform high-output operation even at the high speed (e.g., third speed).

Accordingly, the first motor type is advantageous in that low-speed torque performance may be improved and initial oscillation performance of the vehicle may be increased. In addition, the first motor type is advantageous in that efficiency of the motor 20 and the inverter 30 may be increased due to phase current reduction. However, the first motor type is disadvantageous in that output may be reduced when the speed of the vehicle is the middle and high speeds (e.g., second and third speeds) as inductance and magnetic flux interlinkage increase.

Additionally, the second motor type is advantageous in that acceleration performance of the vehicle at the middle and high speeds (e.g., second and third speeds) may be improved and thus high power performance may be obtained. For example, the second motor type may achieve performance improvement of about 0 to 100 KPH in the vehicle speed due to improved acceleration performance of the vehicle at the middle and high speeds (e.g., second and third speeds). However, in the second motor type, the efficiency of the motor 20 and the inverter 30 may be decreased due to increase in phase current. Therefore, fuel efficiency of the vehicle may be decreased.

Figure 5:
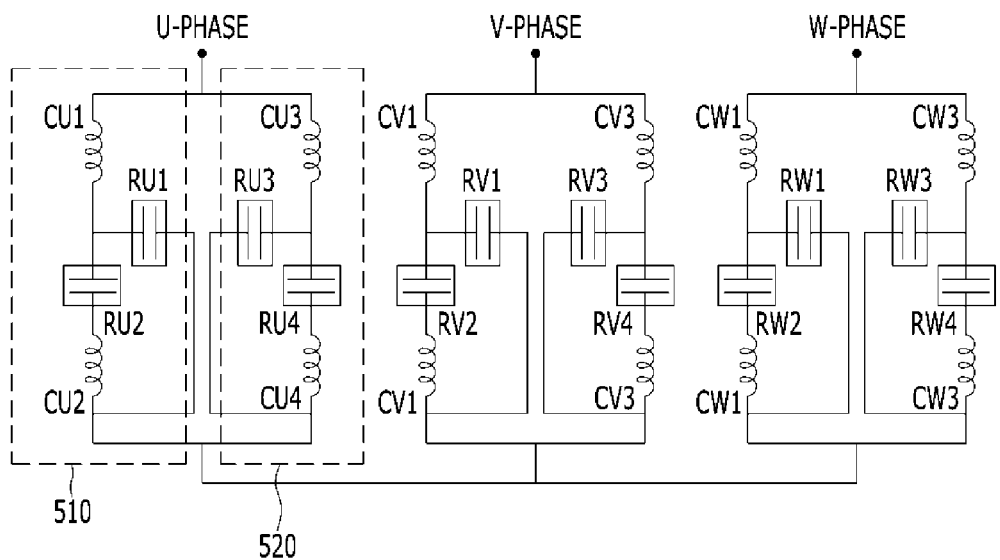
FIG. 5 is a diagram showing the configuration of stator coils and a relay of a motor according to an exemplary embodiment of the present invention.

FIG. 5 is a diagram showing the configuration of stator coils and a relay of a motor according to an exemplary embodiment of the present invention. Referring to FIG. 5, the motor 20 may include three phases U, V and W. Each phase of the motor 20 may include two series circuits. The series circuits may be arranged in parallel with each other. Accordingly, in the circuit connected to the phase U, the first series circuit 510 may include a first stator coil CU1, a second stator coil CU2, a first stator relay RU1 and a second stator relay RU2.

Particularly, the first stator relay RU1 may be connected to the first stator coil CU1 in parallel. The second stator relay RU2 may be connected to the second stator coil CU2 in series. Accordingly, the first stator relay RU1 and the second stator relay RU2 may be connected in parallel. The second series circuit 520 connected to the first series circuit 510 in parallel may include a third stator coil CU3, a fourth stator coil CU4, a third stator relay RU3 and a fourth stator relay RU4. The third stator relay RU3 may be connected to the third stator coil CU3 in parallel. The fourth stator relay RU4 may be connected to the fourth stator coil CU4 in series. Accordingly, the third stator relay RU3 and the fourth stator relay RU4 may be connected in parallel.

In addition, the motor 20 may include the same circuit as the circuit connected to each phase. The motor 20 having such a structure may change the motor type according to the operation mode. The motor 20 may be configured to adjust the number of turns of the stator coils, by operating the stator relays which may be electrically turned on/off in a series/parallel structure based on the motor type. In other words, the number of turns of the stator coils may be changed through on/off control of the stator relay, to reflect the characteristics of the motor 20 suitable for the operation mode.

Operation of controlling the stator relays according to the motor type is shown in the following table.

TABLE 1

| Division | First operation mode (Eco-Normal Mode) | | Second operation mode (High-Power Mode) | |
| --- | --- | --- | --- | --- |
| Stator relay control | R1-OFF | R3-OFF | R1-ON | R3-ON |
|  | R2-ON | R4-ON | R2-OFF | R4-OFF |
| Number of turns of coils connected in series in each phase | 2T | | 1T | |
| Motor type | First motor type | | Second motor type | |

Referring to Table 1, when high-efficiency operation is required, the first operation mode may be selected. Therefore, R1 and R3 of the stator relays of each phase may be turned off and R2 and R4 may be turned on. Accordingly, the number of turns of coils connected in series in each phase is set to 2T and the first motor type may have a relatively large number of turns of the stator coils. Therefore, it may be possible to increase the number of turns of the stator coils. At this time, R1 may be the first stator relay RU1, RV1 or RW1 disposed in each phase, R2 may be a second stator relay RU2, RV2 or RW2 disposed in each phase, R3 may be a third stator relay RU3, RV3 or RW3 disposed in each phase, and R4 may be a fourth stator relay RU4, RV4 or RW4 disposed in each phase.

In addition, when high power performance of the vehicle is required regardless of operation with high fuel efficiency, the second operation mode may be selected. Therefore, R1/R3 of the stator relays of each phase may be turned on and R2/R4 may be turned off. Accordingly, the number of turns of coils connected in series in each phase may be set to 1T and the second motor type may have a relatively small number of turns of the stator coils. Therefore, the second motor type may improve acceleration performance of the vehicle at the middle and high speeds (e.g., second and third speeds). Accordingly, it may be possible to drive the vehicle with higher dynamic performance than the first motor type in which the number of turns of the stator coils is increased.

In another example, when the number of series/parallel structures is added to one of the three phases U, V and W, the number of relays configured in the motor coil is shown in Equation 1 below.

Number of relays in each phase: $[(S-1)*2]*P$      Equation 1 wherein, S denotes the number of stator coils of each of the series circuits and P denotes the number of series circuits connected in parallel.

Accordingly, various series circuits and parallel connection combinations may be possible according to the usage of the motor 20 and the package type in various embodiments and thus modified stator relays may be combined.

Figure 6:
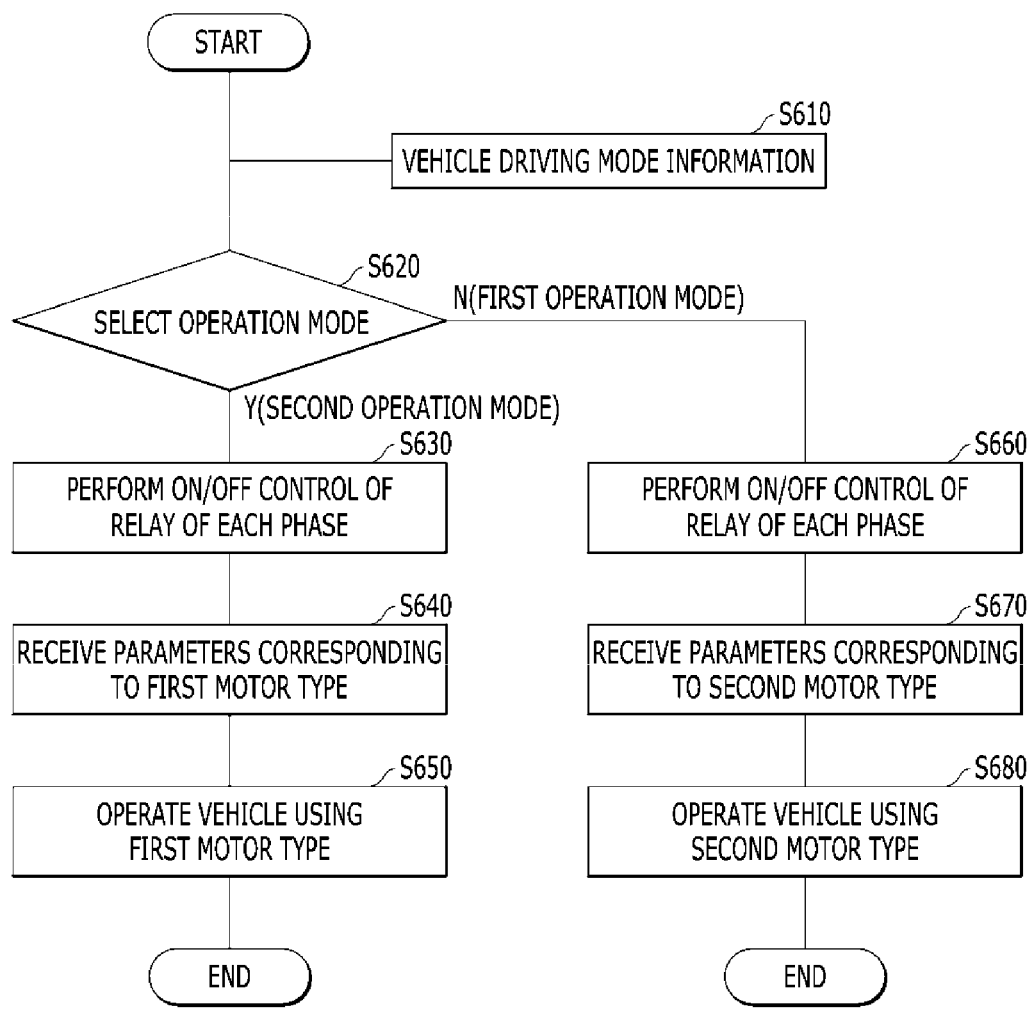
FIG. 6 is a flowchart illustrating a method of driving a motor for an eco-friendly vehicle according to an exemplary embodiment of the present invention.

FIG. 6 is a flowchart illustrating a method of driving a motor for an eco-friendly vehicle according to an exemplary embodiment of the present invention. Referring to FIG. 6, the controller 35 may be configured to receive the vehicle driving mode information. When the vehicle driving mode is a manual mode, the user may select and input an operation mode (S610 and S620). In other words, the controller may be configured to receive a user selection related to an operation mode.

After step S620, when the first operation mode is selected, the controller 35 may be configured to perform on/off control of the stator relays based on the first operation mode (S630). In particular, for control of the stator relays corresponding to the first operation mode, the controller 35 may be configured to turn on the relay switches R2 and R4 disposed in each phase of the motor 20 and to turn off the relay switches R1 and R3. Therefore, the number of turns of the stator coils of the motor 20 may be increased.

After step S630, control parameters for current control according to the first motor type may be received (S640). Therefore, the controller 35 may be configured to adjust the inductance, counter electromotive force constant, current control gain, maximum torque and output of the motor 20. After step S640, the vehicle 100 may operate through the motor 20 of the first motor type (S650).

In addition, after step S620, if the second operation mode is selected, the controller 35 may be configured to perform on/off control of the stator relays based on the second operation mode (S660). In particular, for control of the stator relays corresponding to the second operation mode, the controller 35 may be configured to turn off the relay switches R2 and R4 disposed in each phase of the motor 20 and to turn on the relay switches R1 and R3. Therefore, the number of turns of the stator coils of the motor 20 may be decreased.

After step S660, the control parameters for current control according to the second motor type may be received (S670). Therefore, the controller 35 may be configured to adjust the inductance, counter electromotive force constant, current control gain, maximum torque and output of the motor 20. After step S640, the vehicle 100 may operate through the motor 20 of the second motor type (S680).

The method and method and apparatus for driving the motor for the eco-friendly vehicle according to the present invention have the following effects. If the method and method and apparatus for driving the motor for the eco-friendly vehicle according to the present invention are used, two types of vehicle operations are selectively possible. When high fuel efficiency is required, the number of turns of stator coils may be set to 2T to reduce applied current, thereby reducing loss. In contrast, when high-output power performance is required, the number of turns of stator coils may be set to 1T to obtain high output even at a high speed.

The method according to the exemplary embodiment may be implemented as a program for execution on a computer and stored in a non-transitory computer-readable recording medium. Examples of the non-transitory computer-readable recording medium include a ROM, a RAM, a CD-ROM, a magnetic tape, a floppy disk, and an optical data storage. The non-transitory computer-readable recording medium may be distributed over a plurality of computer devices connected to a network so that computer-readable code is written thereto and executed therefrom in a decentralized manner. Functional programs, code, and code segments needed to realize the exemplary embodiments herein can be construed by one of ordinary skill in the art.

What is claimed is:

1. An apparatus for driving a motor for an eco-friendly vehicle, comprising:
   the motor including a rotor and a stator; and
   a controller configured to operate the motor,
   wherein the motor includes a plurality of stator coils and stator relays, wherein the controller is configured to operate the stator relays based on an operation mode to adjust the number of turns of the stator coils,
wherein the motor includes:
   a first stator coil;
   a second stator coil;
   a first stator relay connected to the second stator coil in parallel; and
   a second stator relay connected to the second stator coil in series,
wherein the first stator coil, the second stator relay, and the second stator coil are connected in series, and
wherein the first stator relay and the second stator relay are connected in parallel.

2. The apparatus according to claim 1, wherein the controller is configured to select the operation mode based on vehicle driving mode information.

3. The apparatus according to claim 1, wherein the controller is configured to select any one of a first operation mode, in which the number of turns of the stator coils is increased, and a second operation mode, in which the number of turns of the stator coils is decreased, as the operation mode.

4. The apparatus according to claim 1, wherein the motor includes three phases.

5. The apparatus according to claim 4, wherein the motor includes series circuits, in which at least two stator coils are connected in series, in each phase, and wherein at least two series circuits are connected in parallel.

6. The apparatus according to claim 1, wherein the number of stator relays is determined by:

$$\text{number of relays in each phase: } [(S-1)*2]*P$$

wherein, S denotes the number of stator coils of each of the series circuits and P denotes the number of series circuits connected in parallel.

7. The apparatus according to claim 1, wherein the controller is configured to turn off the first stator relay and turn on the second stator relay, when the operation mode is a first operation mode.

8. The apparatus according to claim 1, wherein the controller is configured to turn on the first stator relay and turn off the second stator relay, when the operation mode is a second operation mode.

9. A method of driving a motor for an eco-friendly vehicle, comprising:
   selecting, by a controller, an operation mode;
   operating, by the controller, stator relays in a motor based on the operation mode; and
   operating, by the controller, the motor based on the operation of the stator relays,
wherein the motor includes:
   a first stator coil;
   a second stator coil;
   a first stator relay connected to the second stator coil in parallel; and
   a second stator relay connected to the second stator coil in series,
wherein the first stator coil, the second stator relay and the second stator coil are connected in series, and
wherein the first stator relay and the second stator relay are connected in parallel.

10. The method according to claim 9, wherein the selecting of the operation mode includes selecting, by the controller, the operation mode based on vehicle driving mode information.

11. The method according to claim 10, wherein the selecting of the operation mode includes selecting, by the controller, any one of a first operation mode, in which the number of turns of the stator coils is increased, and a second operation mode, in which the number of turns of the stator coils is decreased, as the operation mode.

12. The method according to claim 9, wherein the motor includes three phases.

13. The method according to claim 12, wherein the motor includes series circuits, in which at least two stator coils are connected in series, in each phase, and wherein at least two series circuits are connected in parallel.

14. The method according to claim 13, wherein the number of stator relays is determined by:

$$\text{number of relays in each phase: } [(S-1)*2]*P$$

wherein, S denotes the number of stator coils of each of the series circuits and P denotes the number of series circuits connected in parallel.

15. The method according to claim 9, wherein operating the stator relays of the motor includes turning off, by the controller, the first stator relay and turning on the second stator relay, when the operation mode is a first operation mode.

16. The method according to claim 9, wherein operating the stator relays of the motor includes turning on, by the controller, the first stator relay and turning off the second stator relay, when the operation mode is a second operation mode.

17. A non-transitory computer-readable recording medium having recorded thereon a program for realizing the method according to claim 9.

* * * * *